US005313060A

United States Patent [19]

Gast et al.

[11] Patent Number: 5,313,060

[45] Date of Patent: May 17, 1994

[54] MULTI-SENSOR DOUBLED ROW DIRECTION SENSITIVE COUNTING AND SWITCHING DEVICE

[75] Inventors: Ralf Gast; Andreas Thun; André Haufe; Andreas Wermke, all of Berlin, Fed. Rep. of Germany

[73] Assignee: Iris GmbH I.G. Infrared & Intelligent Sensors, Berlin, Fed. Rep. of Germany

[21] Appl. No.: 920,271

[22] Filed: Oct. 14, 1992

[30] Foreign Application Priority Data

Dec. 14, 1990 [JP] Japan .................................. 4040811

[51] Int. Cl.[5] .............................................. G01V 9/04

[52] U.S. Cl. .................................... 250/221; 250/342; 340/567

[58] Field of Search ..................... 250/221, 342, 338.3, 250/206.1; 340/545, 555, 556, 557, 567; 377/6, 53

[56] References Cited

U.S. PATENT DOCUMENTS

| | | | |
|---|---|---|---|
| 4,321,594 | 3/1982 | Galvin et al. | 250/342 |
| 4,723,192 | 2/1988 | Lee . | |
| 4,799,243 | 1/1989 | Zepke . | |
| 4,847,485 | 7/1989 | Koelsch . | |
| 4,912,748 | 3/1990 | Horii et al. . | |
| 5,012,099 | 4/1991 | Paturel et al. . | |
| 5,045,702 | 9/1991 | Mulleer | 250/342 |

FOREIGN PATENT DOCUMENTS

| | | |
|---|---|---|
| 0245842A1 | 11/1987 | European Pat. Off. . |
| 0276513A1 | 8/1988 | European Pat. Off. . |
| 0287827A2 | 10/1988 | European Pat. Off. . |
| 0345878A2 | 12/1989 | European Pat. Off. . |
| 3225264A1 | 1/1984 | Fed. Rep. of Germany . |
| 3623792C1 | 12/1987 | Fed. Rep. of Germany . |
| 3832428A1 | 4/1989 | Fed. Rep. of Germany . |
| 2602894A1 | 2/1988 | France . |
| 63-316801 | 12/1988 | Japan . |

OTHER PUBLICATIONS

P. N. J. Dennis et al, "Recent Advances in Infrared Surveillance Systems", *Conference Proceedings Military Microwaves 88,* Jul. 5, 1988, London, pp. 93-98.

*Primary Examiner*—David C. Nelms
*Assistant Examiner*—Que T. Le
*Attorney, Agent, or Firm*—Spencer, Frank & Schneider

[57] ABSTRACT

A direction sensitive counting and switching device has an optical system which includes a convex lens and a passive infrared detector composed of sensor elements arranged in at least one double row. The detector is disposed on one side of the convex lens for detecting radiation transmitted along a beam path from persons or objects moving through a detection area of the detector located on the other side of the convex lens and producing output signals in response to the detected radiation. A preamplifier is coupled to the detector for producing amplified output signals from the output signals. An evaluation circuit is coupled to the preamplifier for processing the amplified output signals of the sensor elements and, if the amplified output signals permit a conclusion as to directional movement of a person or object in the detection area of the detector, initiates a counting or a switching process which contains information about direction of movement of the respective person or object in the detection area.

15 Claims, 4 Drawing Sheets

MULTI-SENSOR DOUBLED ROW DIRECTION SENSITIVE COUNTING AND SWITCHING DEVICE

BACKGROUND OF THE INVENTION

The invention relates to a direction sensitive counting and switching device comprising an optical system. The optical system includes a passive infrared detector that has sensor elements for detecting radiation transmitted along a beam path from persons or objects moving through a detection area of the detector and producing output signals in response to the detected radiation. A preamplifier coupled to the detector produces amplified output signals from the output signals from the sensor elements. A subsequently connected evaluation circuit initiates a counting and switching process from the output signals emitted by the sensor elements. The counting and switching process contains information about the direction of movement of a respective person or object.

Direction selective counting and switching devices are employed to count persons and/or objects that move or are moved in different directions. They furnish additional information about the direction of movement of the detected persons and/or objects.

According to the prior art, the counting and the determination of the direction of moving persons/objects has been realized in the past as follows:

When photoelectric barriers are employed, at least two beam transmitters and receivers are attached at each location to be monitored. A precise determination of moving objects/persons is possible only if they cross these barriers in succession.

For traffic monitoring, a loop technology is often employed. For this purpose, induction loops are installed in all traffic lanes. The high installation costs and the traffic impairment caused during the installation of the induction loops are disadvantageous.

Image processing devices are also suitable for a determination of the number and direction of moving objects. However, since these devices pick up signals from moving and non-moving objects, the costs for computer image processing are very high and the devices are therefore relatively expensive.

European Patent 0,287,827 discloses a direction selective pyrodetector which is composed of a sensor equipped with at least two sensor elements for different detection directions and is employed for the detection and velocity determination of moving objects. Since vehicles traveling next to one another are not resolved individually, an accurate count is not possible here.

Another solution, disclosed in European Patent 0,245,842 provides that a plurality of pyroelectric sensor elements are disposed within a mirror of spherical-parabolic shape and it thus becomes possible to perform a detection that is independent of motion and direction. The drawbacks are that objects moving next to one another are not detected individually, the complicated mirror is too expensive for many applications and the frequent requirement for small, unobtrusive detection systems is not met.

According to German Patent 3,407,462 it is possible to realize, for example, a door opener by means of two mutually at least partially covering infrared sensors which have a radiation sensitive surface corresponding to the shape of the desired field of view. Such a door opener does not record persons passing by the door; it responds only to persons directly approaching the door. Thus the door opener is direction selective in only one direction.

Further, German Unexamined Published Patent Application DE-OS 3,225,264 discloses an infrared motion sensor which switches on the illumination of hallways, lobbies, etc. for a predetermined time if persons move through the detection area of the motion sensor. The use of this solution, for example, as a light switch in homes is not possible since, although the illumination in a room is switched on when a person enters it, the light is switched off again at the end of the predetermined period of time if the person in the room does not continue to move.

German Patent 3,623,792 discloses a device employs a plurality of individual infrared sensors that are arranged behind one another in the direction of passage and next to one another transversely to the direction of passage to determine the number of persons and their direction of movement within a room to be monitored or in a passageway. Since the individual sensors have very large fields of view, this device cannot be employed in cases where only very narrow or small fields of view can be realized. Moreover, the use of individual sensors prevents this device from being miniaturized.

In public transportation systems, the number of passengers is analyzed primarily by photoelectric barriers, pressure sensors and sensitive floorboards.

In connection with the use of photoelectric barriers, two radiation transmitters and two radiation receivers are installed at each door of the public transportation means. The successive passage through both photoelectric barriers initiates a counting process which corresponds to the direction of movement of the passenger. Since, however, persons moving closely next to one another cannot be reliably detected individually and objects carried by passengers, such as umbrellas and handbags, are frequently counted as well, a precise determination of the number of passengers is not possible.

In buses, pressure sensors are known to be used at their shock absorbers. Since the number of passengers is determined from the weight of the bus, the determination of their number is not very precise. The pressure sensors cannot be employed in streetcars and railroad trains because of the high weight of the vehicles themselves.

German Unexamined Published Patent Application DE-OS 3,832,428 discloses a device of the above mentioned type. In this device, however, it is not exclusively the moving objects or persons but also non-moving targets within the detection area that are evaluated so that the results are imprecise.

SUMMARY OF THE INVENTION

It is the object of the invention to provide a device of an above-mentioned type which differentiates persons and/or objects from on another with high precision and according to their direction of movement, counts them and/or initiates switching processes, which is economical to manufacture, and can be installed unobtrusively and without any significant structural modifications.

This is accomplished by disposing a detector subsequent to a convex lens, and arranging sensor elements in double rows. The sensor elements emit output signals in response to detected radiation in a detection area of the detector. The output signals are subsequently amplified.

If the amplified output signals permit a conclusion as to the directional movement of a person or object in the detecting area of the detector, a counting or switching process is initiated. The counting and switching process contains information about the direction of movement of a respective object or person in the detection area of the detector.

The invention incorporates the realization that direction sensitive object or person detection is possible with great accuracy if signals are evaluated that contain only information about changes in the detection area. The use of pyroelectric detectors offers an advantageous opportunity to provide a reliably operating direction-dependent detector device which employs a detection matrix composed of few sensor elements.

Such a device is particularly advantageous in public transportation systems, even those involving large numbers of passengers.

Preferably, the device according to the invention is composed of a passive infrared detector comprising a plurality of pyroelectric sensor elements in the form of one or a plurality of double rows disposed subsequent to (i.e., behind) a convex lens, thus dividing the field of view of the direction selective counting and switching device preceding the convex lens into a plurality of smaller viewing fields corresponding to the number, geometry and arrangement of the multi-element detector. The evaluation circuit initiates a counting and/or switching process if a signal train is present that indicates movement of persons and/or objects in the viewing field of the direction selective counting and switching device. The plurality of pyroelectric sensor elements constitute radiation receivers for detecting the thermal radiation emitted by persons and/or objects. Moreover, the pyroelectric sensor elements can be manufactured economically and can be operated without additional cooling.

The preferred use of a convex lens permits the incident thermal radiation to be focused on the pyroelectric sensor elements detector multi-element and additionally permits the significant miniaturization of the device according to the invention compared to prior art devices.

The centered arrangement of an aperture preceding the convex lens avoids the incidence of flat rays and scattered light on the lens as well as total reflections within the lens.

The viewing fields of the direction selective counting and switching device are preferably dimensioned in such a way that persons and/or objects to be detected are reliably detected. The signals appearing at the multi-element detector are amplified in the associated preamplifiers, are digitized in A/D converters and processed in the evaluation circuit. The signal trains from different rows of associated pyroelectric sensors furnish the direction of movement of the persons and/or objects passing through the viewing field of the direction selective counting and switching device.

Since a defined signal train must be present to detect movement in the detection area of the device according to the invention, error functions must be excluded with high probability. The use of an interference filter preceding the convex lens additionally prevents interfering radiation, such as radiation from the sun or from automobile headlights, from impinging on the multi-element detector.

Applications are possible, for example, for the determination of the degree of occupation of public transportation systems, in the analysis of traffic flow, in the control of various building devices, as door openers and person counters as well as in the use of motion dependent switches.

The invention is preferably realized by an arrangement composed of a pyroelectric chip including at least one double row of sensitive elements, an analog preliminary signal processing unit, a digital signal processing unit for the detection of patterns and an optical imaging system, for example a convex lens.

Due to the pyroelectric sensor principle, the movement of objects is detected only if it is connected with a thermal contrast. Thus it is possible to monitor the sequence of movements of a person by simple means. For the pattern detection taking place in a signal processor, it is significant that the constant background furnish no detectable signals. Thus, compared to a conventional video camera, the detection of movement of a person or a moving object is greatly simplified by the suppression of background information. In the invention disclosed here, the signal processor is required to analyze, in the form of a sequence of patterns, only the signals from moving objects that exhibit a thermal contrast relative to the environment.

Other advantageous modifications of the invention will be described in greater detail below together with a description of the preferred embodiment of the invention and the drawing figures.

DETAILED DESCRIPTION OF THE PREFERRED EMBODIMENT

Figure 1:
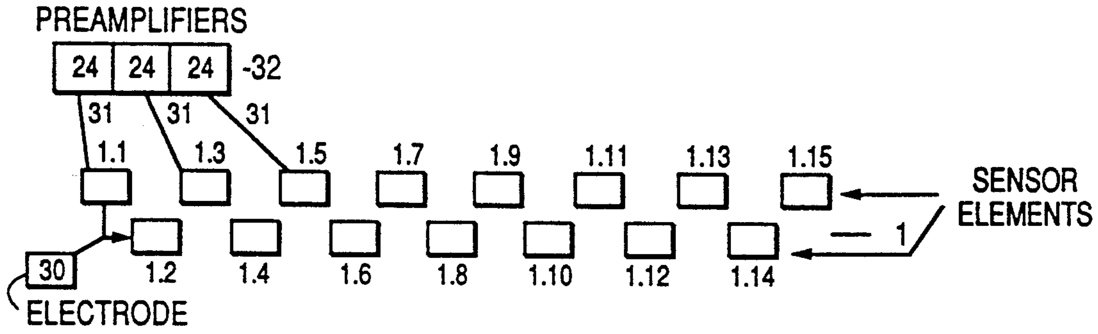
FIG. 1 is a schematic representation of a possible arrangement of a multi-element detector in a double row according to one embodiment of the invention.

FIG. 1 shows a detector 1 composed of fifteen sensor elements 1.1 to 1.15 arranged in a double row. Each sensor element has an associated viewing filed. The individual elements are pyroelectric sensor elements and are arranged offset relative to one another. Typically, two adjacent sensor elements belonging to different rows are provided with a common rear electrode 30. Each sensor element is further provided with a separate lead 31 which is connected to a separate preamplifier 24 in an electrically insulated manner (only three leads and preamplifiers being shown). The separate pre-amplifiers are combined into an integrated module 32. Each sensor element covers a partial region of a viewing field and emits a signal if a change takes place there. In this way, immovable objects or persons are eliminated upon detection without any added electronic expenditures. It is merely necessary to separately amplify the output signals of the individual sensor elements and to process them further. The geometry and arrangement of the multi-element detector corresponds to the geometry and arrangement of the desired viewing fields but is also determined substantially by the shape and the refractive index of the lens and by the distance of the sensor elements from the lens.

Figure 2:
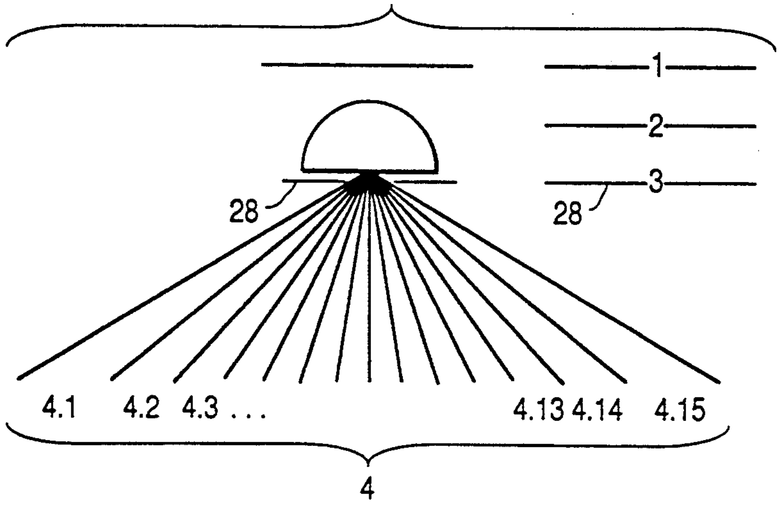
FIG. 2 is a sectional view of an embodiment of the invention using the arrangement of FIG. 1 and shows the associated viewing fields.
Figure 3:
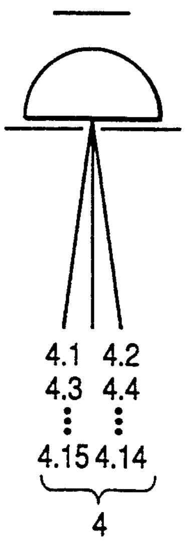
FIG. 3 is a sectional view of the device of FIG. 2 rotated about 90°.

FIGS. 2 and 3 are a front and side view, respectively, of the device according to the invention and its viewing field 4. The detection sectors of the individual sensor elements are arranged in a fan pattern. The number of sensor elements arranged transversely to the direction of passage is selected so that the area to be monitored is covered. It therefore depends on the width of the passage. In the passage direction, however, only a few sensor elements are required (a minimum of two) since it is only necessary to evaluate the time sequence of the detected changes. (Preamplifier, multiplexer, analog/-digital converter and evaluation circuit are not shown here and will be described in greater detail below.)

Detector 1 is disposed in the focal plane of a hemispherical (i.e., plano-convex) lens 2. An interference filter 28 having an aperture 3 is centered in front of the planar side of the lens to keep flat rays and scattered light away from the lens and prevent the occurrence of total reflections in the lens. (In another embodiment of the invention not shown here, an additional interference filter is disposed in the region of the aperture in order to reduce annoying light incidence.) The entire viewing field of the device according to the invention, which covers an angle range of 120° parallel to the double row and an angle range of 16° perpendicular to the double row, is composed of fifteen small (partial) viewing fields 4.1 to 4.15, each having an aperture angle of 8° and being arranged alternatingly at both sides of a plane passing through the center of the lens and between the two rows of sensor elements.

Figure 4:
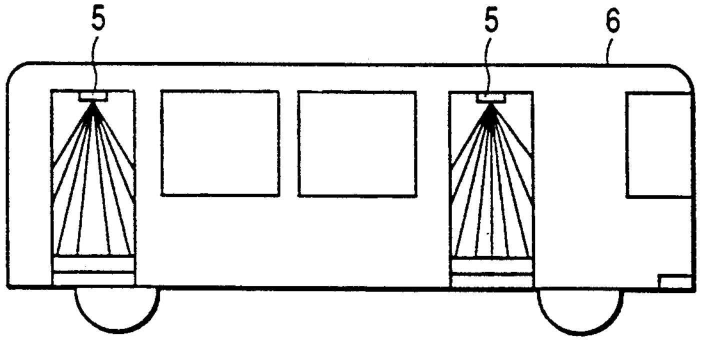
FIG. 4 is a front elevational view of an embodiment using the device according to the invention for detecting the degree of occupation in public transportation systems.

FIG. 4 shows how the device in a housing 5 according to the invention can be employed to detect the degree of occupation in a public transportation system 6. Preferably, the planar surface of lens 2 is flush with an exterior surface of housing 5.

The direction selective counting and switching device is installed in the center above the doors so that the usable door region is in its field of view. When passengers enter or exit, they pass through the plurality of viewing fields of the device according to the invention and thus initiate a counting process.

Figure 5:
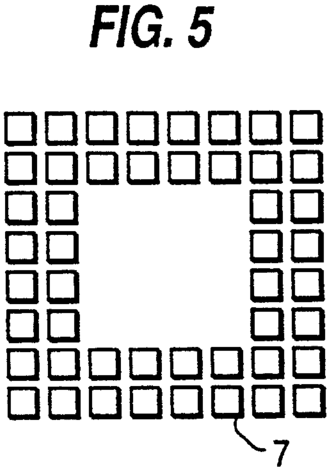
FIG. 5 is a schematic representation which shows a further favorable arrangement of an embodiment of a multi-element detector including a plurality of double rows.

FIG. 5 shows a detector 7 composed of a plurality of sensor elements arranged in a plurality of double rows with viewing fields that completely enclose an area so that it can be detected whether persons or objects enter or leave the monitored area. Such an arrangement is suitable, for example, to control a traffic signal.

Figure 6:
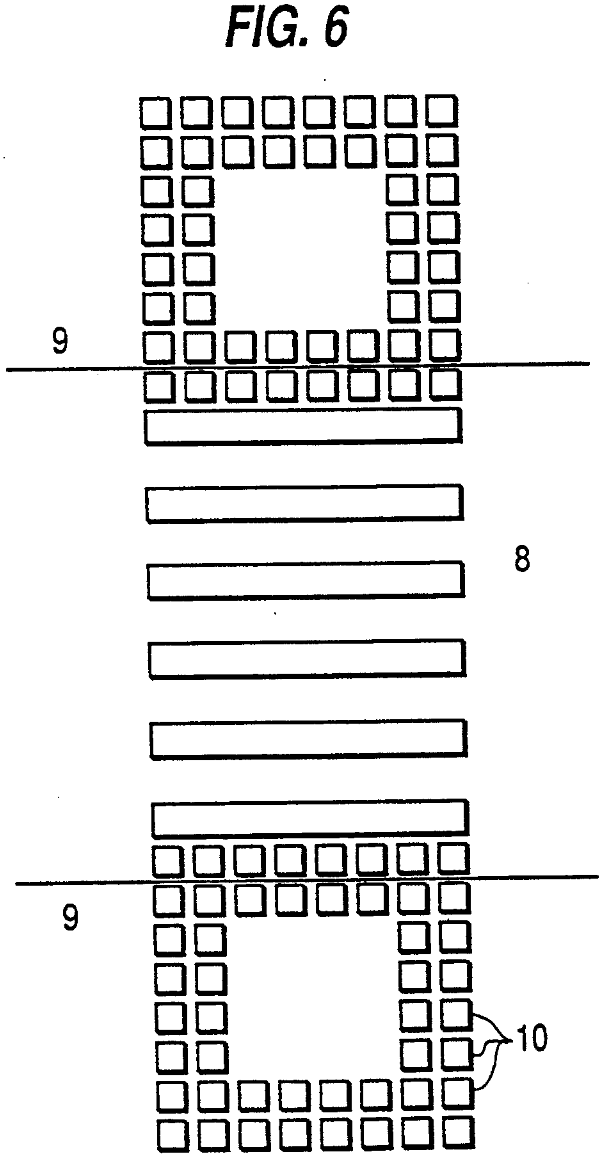
FIG. 6 is a schematic representation which shows an embodiment using the device according to the invention for controlling a traffic signal at a pedestrian crossing.

FIG. 6 shows a pedestrian crossing 8, a traffic signal 9 and the pedestrian detection area 11 that is surrounded by the viewing fields 10 of the device according to the invention. By using a direction selective counting and switching circuit (not shown), the traffic signal can be controlled so that it displays "green" only if in fact pedestrians intend to cross the road at that location. In this way, traffic flow can be kept more constant since non-required green phases of the pedestrian traffic light are eliminated.

Figure 7:
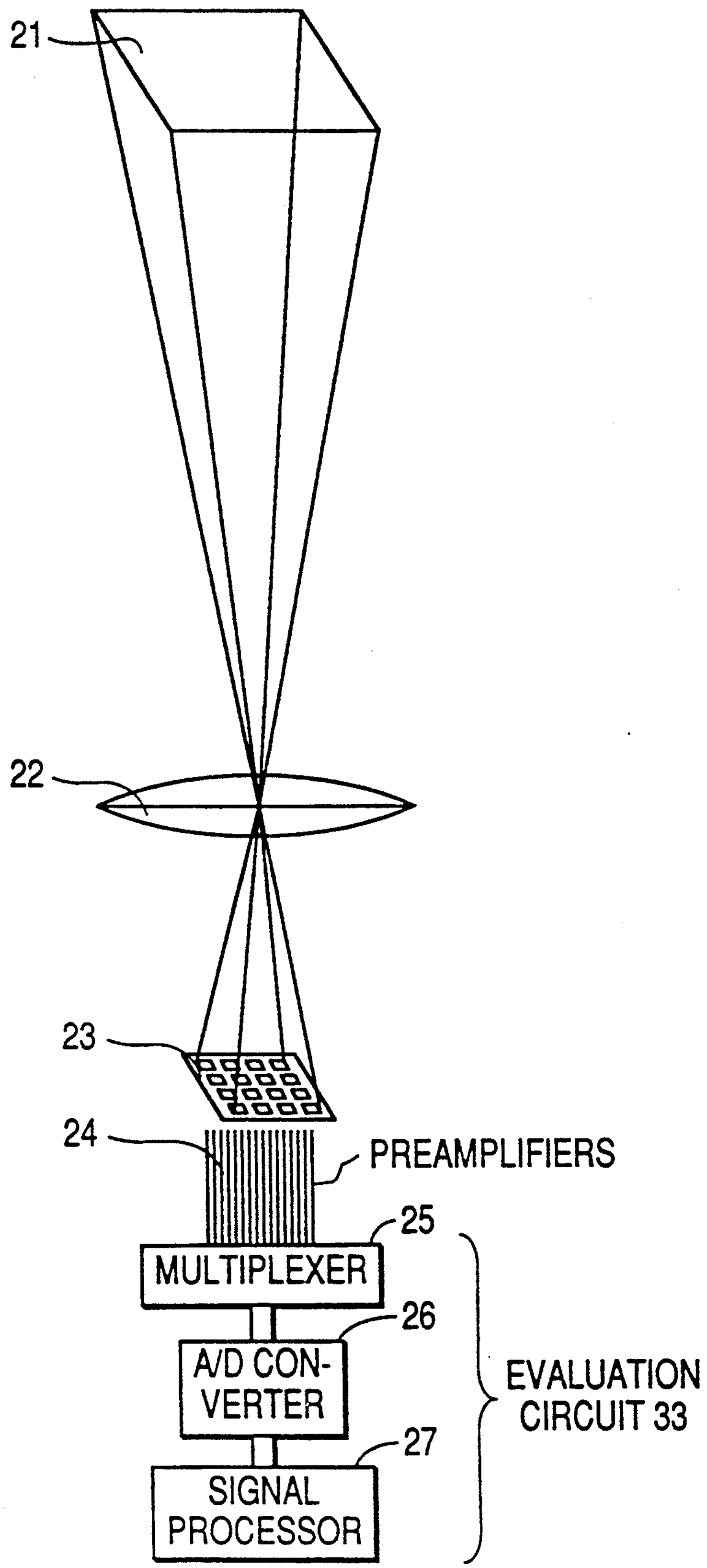
FIG. 7 is a circuit diagram of an embodiment of a device according to the invention including the signal processing unit.
Figure 8D:
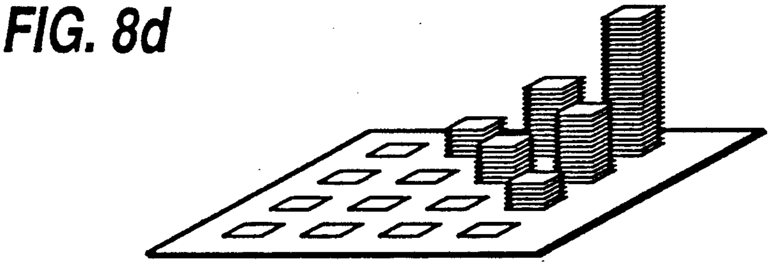
FIGS. 8A–8D are schematics representation of the output signals resulting from the device of FIG. 7.
Figure 8C:
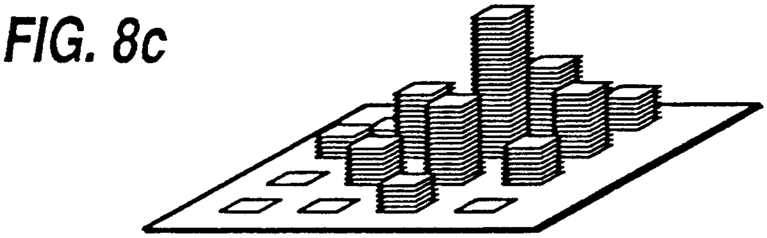
Figure 8B:
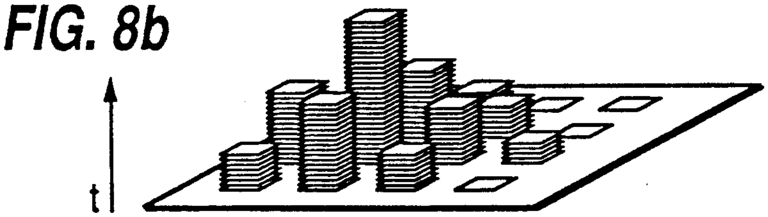
Figure 8A:
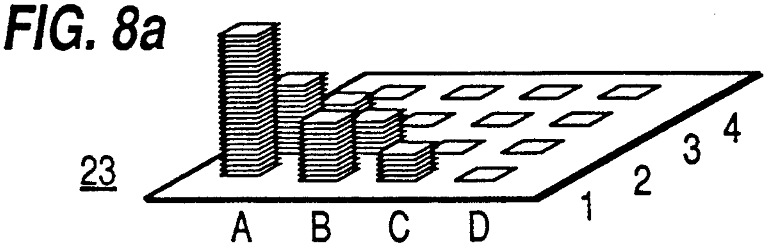

FIG. 7 shows the flow of information in one embodiment of the device according to the invention. The infrared radiation is imaged by means of a lens 22 from an object plane 21 onto a pyroelectric sensor element matrix 23 disposed in the focal plane of lens 22. Typically, lens 22 is a convex, Fresnel type lens made of plastic. The sensitive elements, on which thermal radiation impinges that fluctuates over time record the passage of an object or person by generating a voltage output signal. An occurrence of output signals of essentially adjacent sensor elements at different times causes an evaluation circuit 33 to emit a direction dependent counting signal to record the passage of a person or object. In particular, after analog signal amplification at preamplifier 24, the signal travels to evaluation circuit 33 comprising a multiplexer 25, an A/D converter 26, and a signal processor 27. Multiplexer 25 converts the voltage signal across the individual elements into a serial signal train. This train of analog signals is converted in A/D converter 26 into a digitized signal train. In signal processor 27, a software program produces a gray value pattern to correspond to the original pixel geometry. This pattern indicates in which section of the detection area of the object plane movement took place during a predetermined time window. Signal processor 27 can include a pattern detection circuit, which emits a direction dependent counting signal to record the passage of a person or object.

The recorded gray value pattern as it exists in digitized form after appropriate signal processing is shown in FIGS. 8*a* to 8*d*. The patterns shown in FIGS. 8*a* to 8*d* were recorded at different times in a time grid adapted to the expected passage of an object or a person through the detection area. The time sequence is identified by the direction of the arrow t and corresponds to the sequence of the figure identifications.

The individual sensor elements of the matrix are identified by combinations of letters and numerals. In the signal processor memory, the patterns are stored in correspondingly coded form. The type of signal processing and memory organization is a function of the type of processor employed and need therefore not be described in greater detail here since it is disclosed in the appropriate system handbooks.

After storage of the successive patterns in the memory, the patterns are analyzed by a comparison of patterns that are successive in time. After analyzing the patterns, signal processor 27 initiates a counting or a switching process, by emitting a direction dependent counting or switching signal.

It can be seen that in the illustrations of FIGS. 8*a* to 8*d* an object has moved from corner A1 to corner D4. The detection of moving objects according to their direction is now effected in that the signal differences in adjacent fields of the time grid at successive points in time are compared with one another. Each increase or decrease in the signal that takes place at a later point in time compared to an adjacent element is evaluated as movement of the element in the direction toward the element in which the change occurred later (for example, elements D2/D3 in FIGS. 8*a* and 8*b*). Certain adjacent sensors in which signal changes were observed in adjacent time periods are averaged and combined so that the detection for the respective object initiates only one recording process in an appropriate subsequently connected counter in association with the respective direction. If thus, in the illustration according to FIGS. 8*a* to 8*d*, various smaller objects are detected, they are recorded in different counters corresponding to their direction of movement. They may additionally be classified according to size.

It ca be seen that in the solution according to the invention, because of the use of pyroelectric sensor elements, only changes in the signals—that is, moving objects are detected while simultaneously non-moving objects disposed in the detection area do not influence the signal processing. Thus a large portion of annoying signals is eliminated right from the start and need not be eliminated in an expensive manner by way of interference suppression.

As a result of the comparison of the patterns, the geometric size, direction and number of the moving objects can be detected as required for the particular application.

The invention has produced a device which is able to distinguish persons and/or objects from one another and according to their directions of movement with high accuracy, counts them and/or initiates switching processes is significantly smaller than prior art infrared motion detectors, can be manufactured economically and can be installed without significant structural modifications.

The invention is not limited in its embodiments to the above-described preferred, exemplary embodiment. Rather, a number of variations are conceivable which take advantage of the described solution even for basically different configurations.

We claim:

1. A direction sensitive counting and switching device, comprising:

an optical system including a convex lens and a passive infrared detector composed of a plurality of sensor elements arranged in at least one double row of sensor elements and disposed on one side of said convex lens for detecting radiation transmitted along a beam path from persons or objects moving through a detection area of said detector located on the other side of said convex lens and producing output signals in response to the detected radiation;

a preamplifier coupled to said detector for producing amplified output signals from the output signals from said sensor elements; and an evaluation circuit means coupled to said preamplifier for processing the amplified output signals of said sensor elements and, if the amplified output signals permit a conclusion as to directional movement of a person or object in the detection area of the detector, initiating one of a counting and switching process which contains information about direction of movement of the respective person or object in the detection area.

2. A device according to claim 1, further comprising means defining an aperture disposed in the beam path preceding said convex lens.

3. A device according to claim 1, further comprising an interference filter disposed in the beam path preceding said convex lens.

4. A device according to claim 1, wherein said convex lens is comprised of plastic.

5. A device according to claim 1, wherein said convex lens is a Fresnel lens.

6. A device according to claim 1, wherein said sensor elements are comprised of pyroelectric material.

7. A device according to claim 1, wherein two adjacent sensor elements belonging to different rows have a common rear electrode.

8. A device according to claim 1, wherein said sensor elements each have a detection area and the double rows of said sensor elements are arranged so that the detection areas of said sensor elements completely or partially enclose a predetermined geometrical area.

9. A device according to claim 1, wherein each sensor element has a separate lead and is connected in an electrically insulated manner.

10. A device according to claim 9, and further comprising a plurality of separate preamplifiers each connected to a respective one of the separate leads of said sensor elements.

11. A device according to claim 10, wherein said plurality of separate preamplifiers are combined into an integrated module.

12. A device according to claim 1, wherein said evaluation circuit means compares signal differences between adjacent sensor elements at successive points in time and emits a direction dependent counting signal to record the passage of a person or an object, respectively, if the signal difference increases or decreases.

13. A device according to claim 12, wherein said evaluation circuit means emits only a single direction dependent counting signal to record the passage of a person or an object, respectively, if the signal difference increases or decreases in the same direction successively in time within a predetermined time window.

14. A device according to claim 1, wherein said evaluation circuit means records the amplified output signals in a gird at successive points in time to form successive patterns of output signals, and said evaluation circuit means includes pattern detection circuit means which emits a direction dependent counting signal to record the passage of a person or an object upon detecting changes in the patterns at successive points in time.

15. A device according to claim 1, wherein the convex lens is a plano-convex lens having a planar surface, said planar surface being flush with an exterior surface of a housing enclosing the direction sensitive counting and switching device.

* * * * *

UNITED STATES PATENT AND TRADEMARK OFFICE

CERTIFICATE OF CORRECTION

PATENT NO. : 5,313,060

DATED : May 17, 1994

INVENTOR(S) : Ralf GAST et al

It is certified that error appears in the above-indentified patent and that said Letters Patent is hereby corrected as shown below:

On title page, item [30] Foreign Application Priority Data to read as follows:

--Dec. 14, 1990 [DE] Fed. Rep. of Germany ............... 4040811 --.

Signed and Sealed this

Sixth Day of September, 1994

Attest:

Bruce Lehman

BRUCE LEHMAN

*Attesting Officer*

*Commissioner of Patents and Trademarks*